United States Patent
Kondo et al.

[11] Patent Number: 5,903,481
[45] Date of Patent: * May 11, 1999

[54] INTEGRATED CIRCUIT FOR PROCESSING DIGITAL SIGNAL

[75] Inventors: Tetsujiro Kondo; Takashi Horishi, both of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/640,747

[22] PCT Filed: Sep. 7, 1995

[86] PCT No.: PCT/JP95/01779

§ 371 Date: May 6, 1996

§ 102(e) Date: May 6, 1996

[87] PCT Pub. No.: WO96/07987

PCT Pub. Date: Mar. 14, 1996

[30] Foreign Application Priority Data

Sep. 9, 1994 [JP] Japan .................................. 6-242150

[51] Int. Cl.⁶ .................................................. G06F 17/10
[52] U.S. Cl. ...................... 364/724.1; 364/700; 364/707; 364/88; 364/489
[58] Field of Search .............................. 364/724.01, 231, 364/231.2, 231.3, 232.2, 232.7, 232.8, 232.9, 223, 700, 707, 926; 257/113, 114, 116, 43, 44, 265, 263, 272, 338, 368; 326/15; 324/674, 681, 707; 396/127; 701/114; 370/60.1

[56] References Cited

U.S. PATENT DOCUMENTS

| | | | |
|---|---|---|---|
| 4,951,125 | 8/1990 | Kojima et al. .......................... | 358/580 |
| 5,008,752 | 4/1991 | Van Nostrand .......................... | 358/581 |
| 5,027,423 | 6/1991 | Kawata et al. ...................... | 364/724.01 |
| 5,068,823 | 11/1991 | Robinson ................................ | 395/500 |
| 5,079,734 | 1/1992 | Riley .................................. | 364/724.1 |
| 5,107,254 | 4/1992 | Choi ....................................... | 340/127 |
| 5,193,003 | 3/1993 | Kondo ................................... | 358/409 |
| 5,307,167 | 4/1994 | Park et al. .............................. | 348/704 |
| 5,406,334 | 4/1995 | Kondo et al. ........................... | 348/581 |
| 5,453,800 | 9/1995 | Kondo et al. ........................... | 348/699 |
| 5,499,057 | 3/1996 | Kondo et al. ........................... | 348/607 |

OTHER PUBLICATIONS

M, Bertran, Filtrado Digital, Mundo Electronico, No. 49, pp. 39–43, Feb. 1976.

J.G. M. Goncalves, LSI module for the implementation of digital filters, IEE PRO., vol. 128, Pt. F, No. 6, Nov. 1981.

A. T. Anderson, Programable digital filter performs multiple functions, Electronic Communication Inc. (USA), vol. 43 No. 22 pp. 78–84, Oct. 1970.

*Primary Examiner*—Reba I. Elmore
*Assistant Examiner*—McDieunel Marc
*Attorney, Agent, or Firm*—Frommer Lawrence & Haug, LLP; William S. Frommer; Dennis M. Smid

[57] ABSTRACT

An integrated circuit formed on a single chip, such as a large-scale integration (LSI) chip, which enables a plurality of digital signal processing functions to be performed. A desired digital signal processing function may be selected from among the plurality of available processing functions by the use of a control signal or signals supplied from outside the LSI chip. The LSI chip may include input terminals t1, t2, and t2'; output terminals t3 and t4; and a control signal input terminal t5. Additionally, the LSI chip may further include class sorting circuits, delay and switching circuits, switching circuits, coefficient memories, filter operating circuits, a line delay circuit, and a product sum operating circuit.

10 Claims, 10 Drawing Sheets

INTEGRATED CIRCUIT FOR PROCESSING DIGITAL SIGNAL

TECHNICAL FIELD

The present invention relates to an integrated circuit for processing, for example, a digital image signal.

BACKGROUND ART

For example, in case of constructing a hardware for processing a digital image signal as a large scale integration (LSI), one of its methods is to develop and design an exclusive-use LSI corresponding to its process and another method is to use a DSP (Digital Signal Processor) having generality. The DSP comprises a product sum operator, an RAM/ROM, and the like and can execute digital signal processes of an FFT, a digital filter, and the like.

In case of the method of developing and designing the exclusive-use LSI, it is necessary to develop and design LSIs of the number corresponding to the number of kinds of digital signal processes. Although The DSP has excellency in generality, there is a problem of a bad efficiency.

DISCLOSURE OF INVENTION

It is, therefore, an object of the invention to provide an integrated circuit for processing a digital signal in which basic hardware constructions are made common and a plurality of functions can be realized by one chip.

According to the invention, there is provided an integrated circuit for processing a digital signal in which a plurality of circuit groups and selecting means which can switch at least two states are provided in a single integrated circuit and the selecting means is selectively controlled by a signal from the outside, characterized in that when the selecting means selects a first selection state, at least a part of the plurality of circuit groups is set to a first connection state and is enabled to perform a first signal processing function in the first connection state and, when the selecting means selects a second selection state, at least a part of the plurality of circuit groups is set to a second connection state different from the first connection state and is enabled to perform a second signal processing function different from the first signal processing function.

The selecting means is controlled by a control signal which is given from the outside of the integrated circuit, thereby switching the connection states of the plurality of circuit groups. The constructions of the hardwares in the integrated circuit are made common and the plurality of functions which can be selectively designated by a control signal can be realized by an integrated circuit of one chip.

BEST MODE FOR CARRYING OUT THE INVENTION

Figure 1:
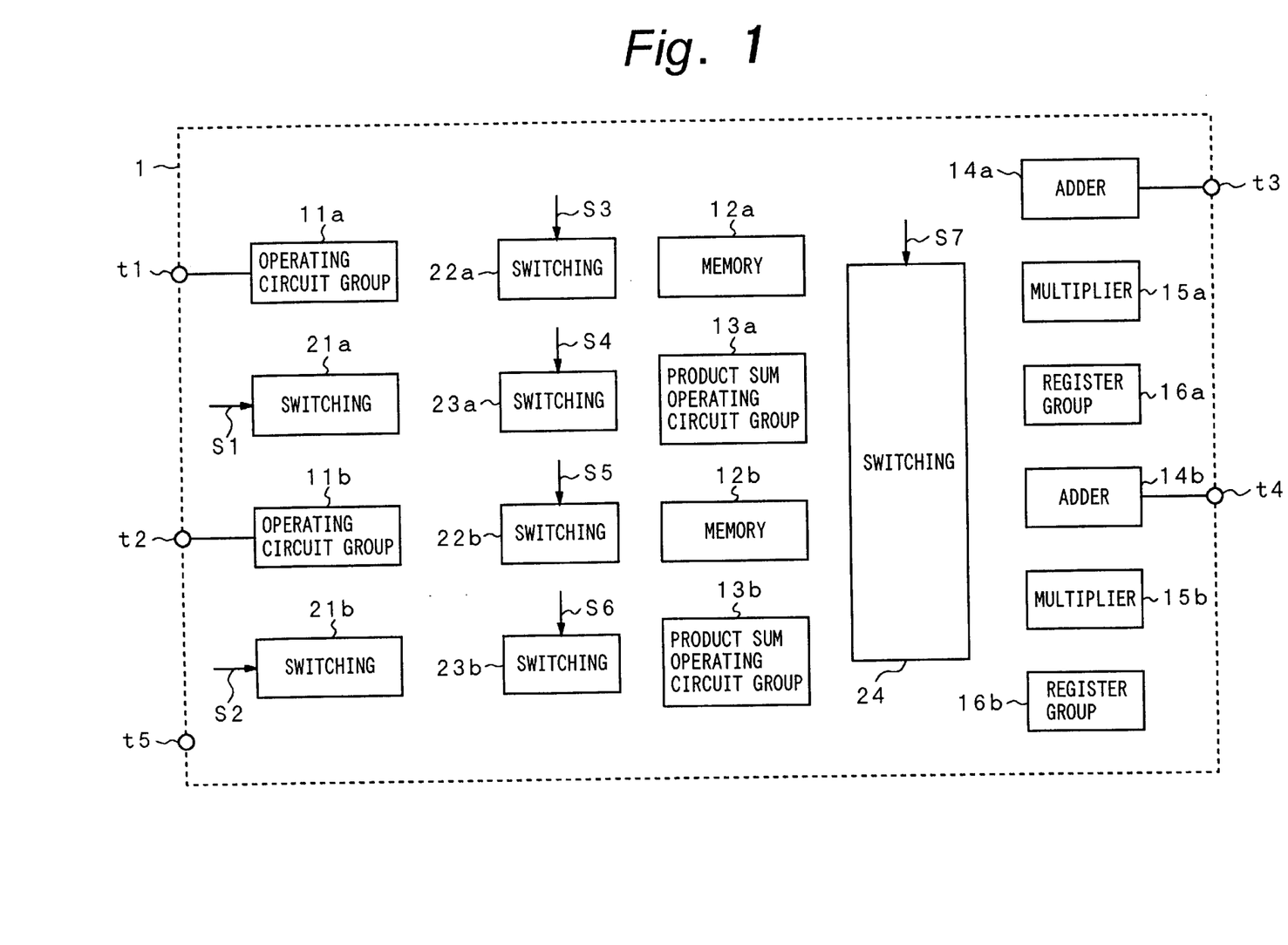
FIG. 1 is a block diagram showing a construction of an embodiment of an integrated circuit according to the invention.

The invention will be described hereinbelow with reference to the drawings. FIG. 1 shows a construction of an LSI 1 in an embodiment of the invention. Namely, in FIG. 1, a construction surrounded by a broken line is a construction of the integrated circuit (LSI) 1 of one chip. The LSI 1 has input terminals t1 and t2, output terminals t3 and t4, and a control signal input terminal t5. Although not shown, a power source terminal, a test terminal, and the like are actually provided for the LSI 1 in addition to the input/output terminals like an ordinary LSI.

A plurality of circuit groups are formed in the LSI 1. Those are: operating circuit groups 11a and 11b; memories 12a and 12b; product sum operating circuit groups 13a and 13b; adders 14a and 14b; multipliers 15a and 15b; and register groups 16a and 16b. For the circuit groups or circuits, a switching device for switching inputs/outputs or connecting states among them (they mean both of a mutual connection among the circuit groups or circuits and a mutual connection among circuits in the circuit group) is provided in the LSI 1. In other words, a flow of a digital signal in the LSI 1 and functions of the respective circuit groups can be controlled by the control signals.

That is, switching devices 21a and 21b are provided in relation to the operating circuit groups 11a and 11b, switching devices 22a and 22b are provided in relation to the memories 12a and 12b, and switching devices 23a and 23b are provided in relation to the product sum operating circuit groups 13a and 13b. A switching device 24 is provided in relation to the adders 14a and 14b, multipliers 15a and 15b, and register groups 16a and 16b. Control signals S1 to S7 each consisting of several bits are supplied to the switching devices 21a, 21b, 22a, 22b, 23a, 23b, and 24, respectively. The control signals S1 to S7 can be supplied from an external control signal generator (for example, construction to generate a predetermined control signal by a lip switch) through the control signal input terminal t5.

According to the construction of FIG. 1, a construction of predicting process by a class sorting can be realized by the control signals S1 to S7. The class sorting prediction process will be more specifically described by an embodiment, which will be described hereinlater. Class sorting circuits based on a level distribution are constructed by the operating circuit groups 11a and 11b, respectively, linear coupling (filter) operating circuits are constructed by the product sum operating circuit groups 13a and 13b, respectively, and memories for storing coefficients for prediction are constructed by the memories 12a and 12b, respectively. Further, mixing circuits for mixing (or switching) prediction signals from two 1-dimensional filters are constructed by the adders 14a and 14b and register groups 16a and 16b.

The LSI 1 of FIG. 1 can also construct a noise reducer using a class sorting process. The noise reducer has a construction such that noise-eliminated outputs formed by a two-dimensional filter operation and a three-dimensional filter operation on the basis of the class sorting are mixed in accordance with motion coefficients. In case of the noise reducer, by the operating circuit groups 11a and 11b, a two-dimensional filter circuit is constructed by the product sum operating circuit group 13a, a three-dimensional filter circuit is constructed by the product sum operating circuit group 13b, the memories for storing the coefficients for prediction are constructed by the memories 12a and 12b, respectively, and the mixing circuits for mixing the noise-eliminated signals from the 2-dimensional filter and 3-dimensional filter in accordance with the motion coefficients are constructed by the adders 14a and 14b and register groups 16a and 16b.

Figure 2:
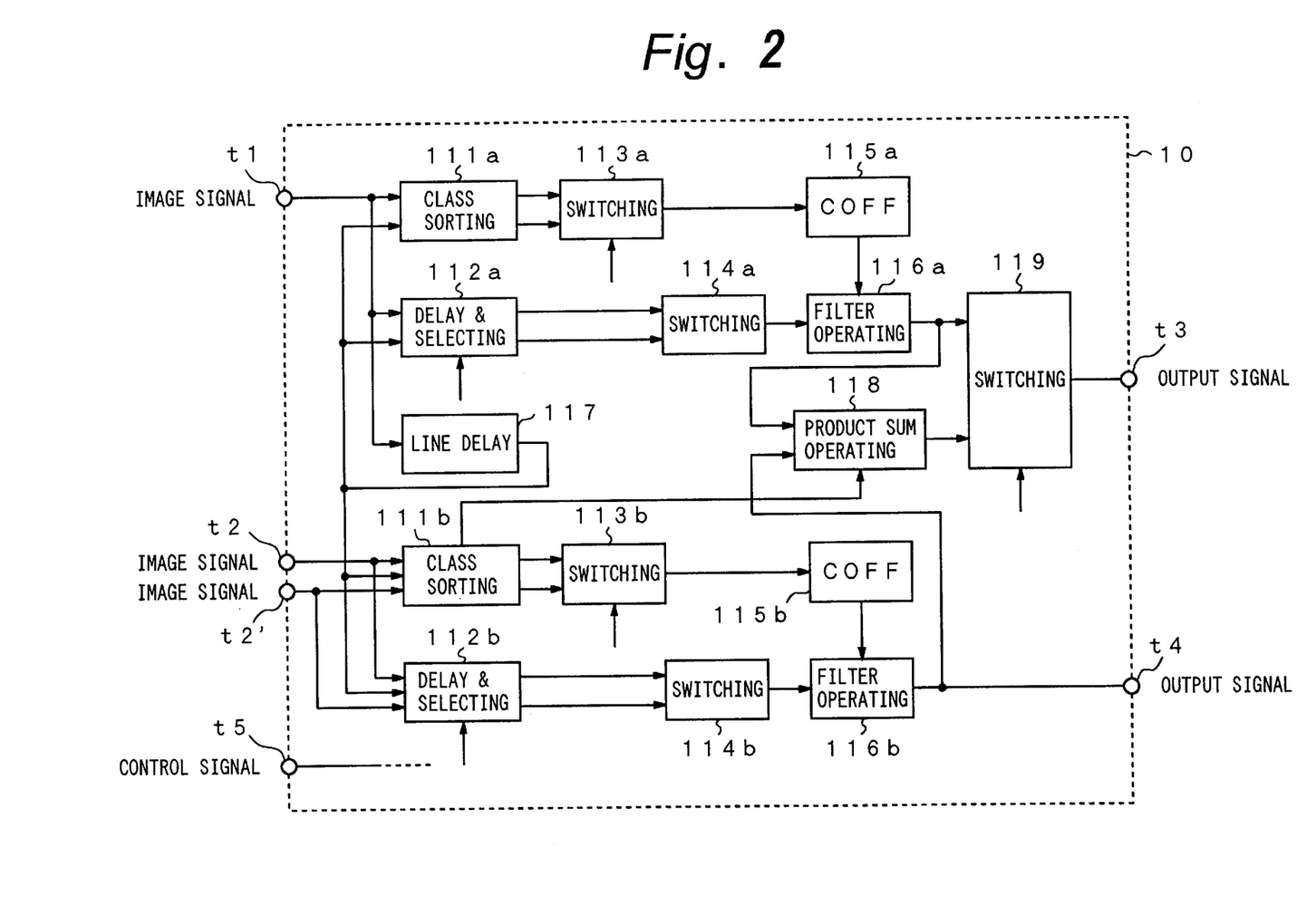
FIG. 2 is a block diagram showing a construction of another embodiment of an integrated circuit according to the invention.

FIG. 2 shows another embodiment of the invention. Another embodiment has a construction which enables a class sorting adapting process in a manner similar to the construction shown in FIG. 1. In FIG. 2, reference numeral 10 denotes an LSI and the LSI 10 has: input terminals t1, t2, and t2' to which the digital image signals are supplied; terminals t3 and t4 from which the digital image signals processed by the LSI 10 are outputted; and a terminal t5 to which the control signal is supplied.

The image signal from the input terminal t1 is supplied to a class sorting circuit 111a, a delay and selecting circuit 112a, and a line delay circuit 117. As will be described hereinlater, the class sorting circuit 111a is constructed to execute a logical operation in order to sort a class of a target pixel as a processing target by a target pixel value and a distribution of pixel values around the target pixel value. An output of the class sorting circuit 111a is supplied to a switching circuit 113a. The class sorting circuit 111a can output two kinds of combinations as combinations of a plurality of pixels which are used for the class sorting. For example, a class sorting using a plurality of pixel values in a one-dimensional array and a class sorting using a plurality of pixel values in a two-dimensional array can be executed and one of outputs (class information) of the two class sorting operations is selected by the switching circuit 113a. The switching circuit 113a is switched by a control signal from the terminal t5. The selected class information is supplied as an address to a coefficient memory 115a.

The delay and selecting circuit 112a is constructed by a register group, a line delay circuit, and a selector. The register is used as a sampling delay element. The delay and selecting circuit 112a is switched by the control signal from the terminal t5. The delay and selecting circuit 112a corrects a time deviation between signals which occurs due to different signal processes and generates tap outputs necessary for a filter operation. As tap outputs, a tap output for the one-dimensional filter and a tap output for a two-dimensional filter are formed. In each of the one- and two-dimensional filters, two tap structures can be switched and respective outputs of the two tap structures are supplied to a switching circuit 114a. A plurality of tap outputs (pixel data) selected by the switching circuit 114a are supplied to a filter operating circuit 116a.

Coefficient data from the coefficient memory 115a is also supplied to the filter operating circuit 116a and a filter output is formed by a product sum operation. That is, the tap outputs (a plurality of pixel data) via the switching circuit 114a and a plurality of coefficients read out from the coefficient memory 115a are calculated by a linear coupling, so that a prediction value is produced.

The line delay circuit 117 is a circuit which is constructed by a memory and causes a delay of one to several lines. An output of the line delay circuit 117 is supplied to another class sorting circuit 111b.

The class sorting circuit 111b, a delay and selecting circuit 112b, a switching circuit 113b, a switching circuit 114b, a coefficient memory 115b, and a filter operating circuit 116b are provided so as to have a connecting relation similar to that of the above-mentioned class sorting circuit 111a, delay and selecting circuit 112a, switching circuit 113a, switching circuit 114a, coefficient memory 115a, and filter operating circuit 116a. An image signal from the input terminal t2 is supplied to the class sorting circuit 111b and delay and selecting circuit 112b.

The switching circuits 113a, 113b, 114a, 114b, and a switching circuit 119, which will be described hereinlater, is controlled by the control signal from the terminal t5. Prediction (filter) coefficients obtained by a learning have preliminarily been stored in the coefficient memories 115a and 115b. By an initializing operation executed by a master reset pulse which is generated by, for example, a power-on or the like, the prediction coefficients are transferred from an external memory to the coefficient memories 115a and 115b of the LSI 10.

An output of the filter operating circuit 116a is supplied to a product sum operating circuit 118 and the switching circuit 119. An output of the filter operating circuit 116b is supplied to the product sum operating circuit 118 and is also extracted as an output signal to the output terminal t4. An output signal of the product sum operating circuit 118 is supplied to the switching circuit 119. When the product sum operating circuit 118 constructs a noise reducer, the outputs of the filter operating circuits 116a and 116b are mixed on the basis of the motion coefficients which are outputted from the class sorting circuit 111b. The switching circuit 119 is switched in accordance with the control signal from the terminal t5 and selects one of the output of the filter operating circuit 116a and the output of the product sum operating circuit 118 and the selected output is taken out to the output terminal t3.

Further, an output signal of the line delay circuit 117 and an image signal from an input terminal t2' are supplied to the class sorting circuit 111b and the delay and selecting circuit 112b. By supplying the image signals having a time difference of one frame from the input terminals t2 and t2', the class sorting circuit 111b can perform a three-dimensional class sorting and the delay and selecting circuit 112b can selectively have a one-, two-, or three-dimensional tap structure.

According to the construction of the foregoing embodiment of the invention, a plurality of digital signals can be processed by changing the control signal. A specific example will now be described. First, an example of applying the invention to an up-conversion process of a digital television signal will be described. An example of the up-conversion such that a digital television signal (called an SD signal) of a standard resolution is inputted and a separating process for first doubling the number of pixels in the vertical direction and subsequently doubling the number of pixels in the horizontal direction is executed, thereby forming a digital television signal (called an HD signal) of a high resolution in which the number of pixels is four times will be described here. It is also possible to execute the process in the horizontal direction first, and then, the process in the vertical direction.

Figure 3:
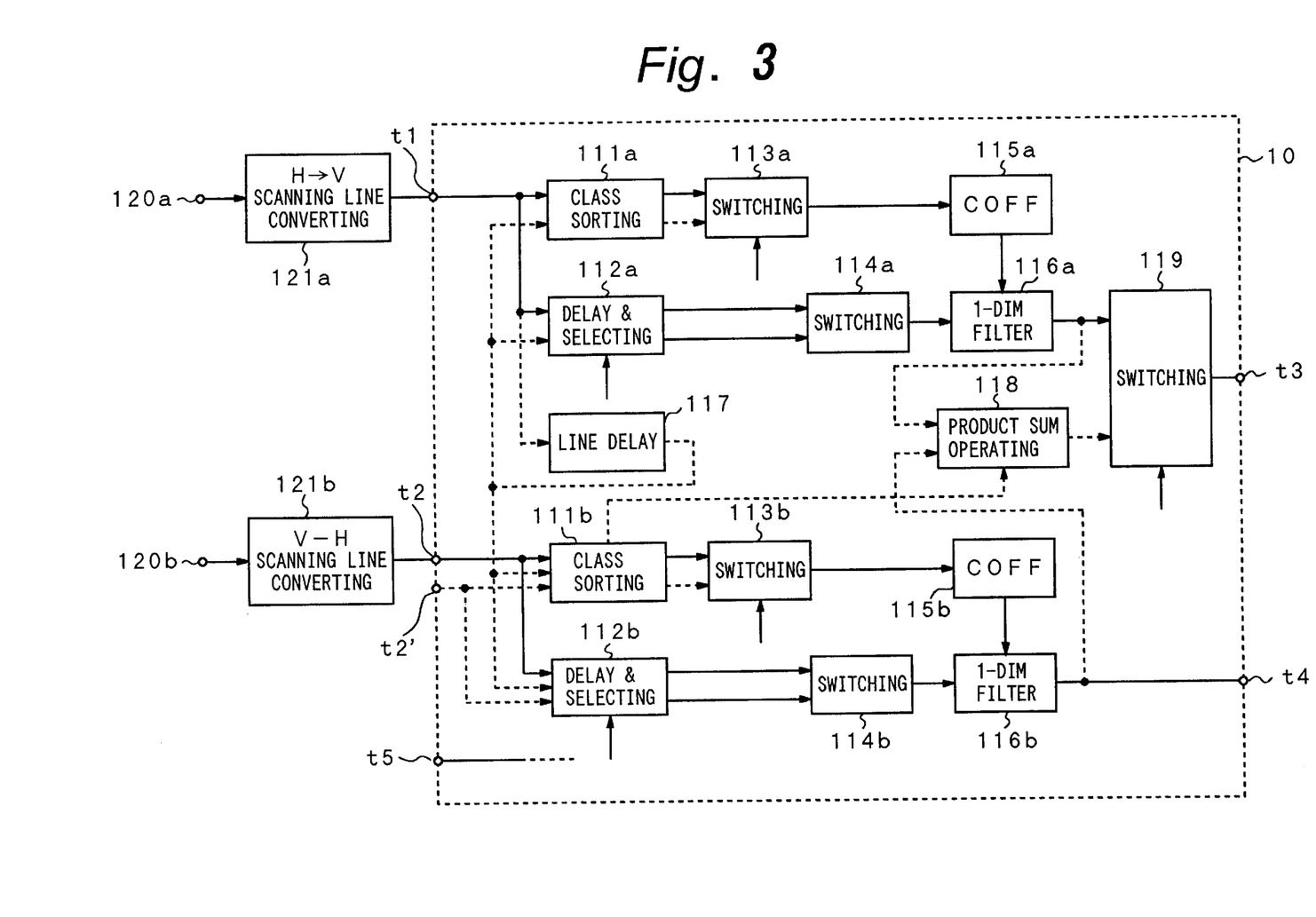
FIG. 3 is a block diagram of an up-conversion circuit as one of functions which are realized by another embodiment of the invention.
Figure 11:
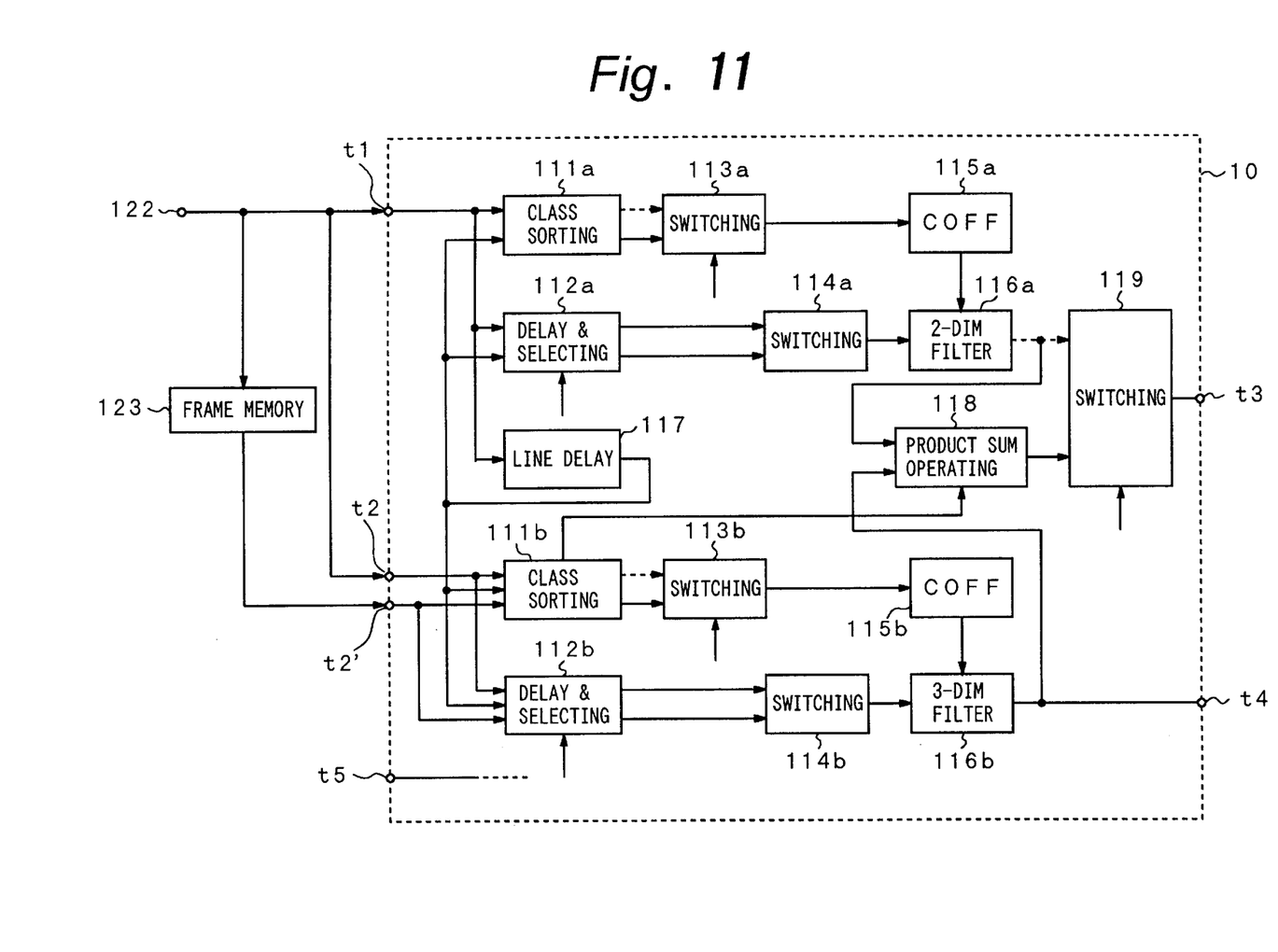
FIG. 11 is a block diagram of a noise reducer as another one of the functions which are realized by another embodiment of the invention.

FIG. 3 shows the LSI 10 constructed so as to perform the up-conversion process by the control signal from the terminal t5. In FIG. 3 and FIG. 11, which will be described hereinlater, signal lines shown by broken lines denote signal lines which are wired but are related to signals which are not selected by the switching circuits 113a, 113b, 114a, 114b, and 119. The SD signal is supplied to an input terminal 120a and is supplied to the input terminal t1 of the LSI 10 via a horizontal/vertical scanning line converting circuit 121a. The scanning line converting circuit 121a includes a memory and executes a conversion from a horizontal scan (scanning order of television raster) to a vertical scan. That is, pixels arranged in the vertical direction at sampling positions are outputted in accordance with the order from the sampling position at the left end of a screen to the right end or the order from the upper side to the lower side at each of the sampling positions.

Circuits functioning at the time of the up-conversion will now be described. The class sorting circuit 111a and delay and selecting circuit 112a are connected to the input terminal t1. The class information (code signal) as a result of the 1-dimensional class sorting from the class sorting circuit 111a is supplied as an address through the switching circuit 113a to the coefficient memory 115a. Coefficients obtained by the learning have preliminarily been stored in the coefficient memory 115a. The coefficients read out from the coefficient memory 115a are supplied to the filter operating circuit (1-dimensional filter) 116a.

The filter operating circuit 116a multiplies a plurality of pixel data of the SD signal and a plurality of coefficients from the coefficient memory 115a and adds the multiplication results. An output signal of the filter operating circuit 116 is taken out to the output terminal t3 through the switching circuit 119. By the construction between the input terminal t1 and the output terminal t3, the number of pixels are doubled in the vertical direction. The output signal is returned to an input terminal 120b of the LSI 10 and is supplied from the input terminal 120b to a vertical/horizontal scanning line converting circuit 121b. An output signal of the scanning line converting circuit 121b is again supplied to the input terminal t2 of the LSI 10. The scanning line converting circuit 121b includes a memory and performs a conversion from the vertical scan to the horizontal scan. That is, the output signal of the scanning line converting circuit 121b becomes a signal of a scan similar to that of the television raster.

In a manner similar to the input terminal t1 mentioned above, the class sorting circuit 111b and delay and selecting circuit 112b are connected to the input terminal t2. Further, a process for doubling the number of pixels in the horizontal direction is executed by the above-mentioned circuit blocks, the switching circuit 113b, switching circuit 114b, coefficient memory 115b, and filter operating circuit (1-dimensional filter) 116b. Consequently, the signal (HD signal) having the pixels of the number which is four times in which the number of pixels in each of the horizontal and vertical directions is doubled is obtained at the output terminal t4.

Figure 4:
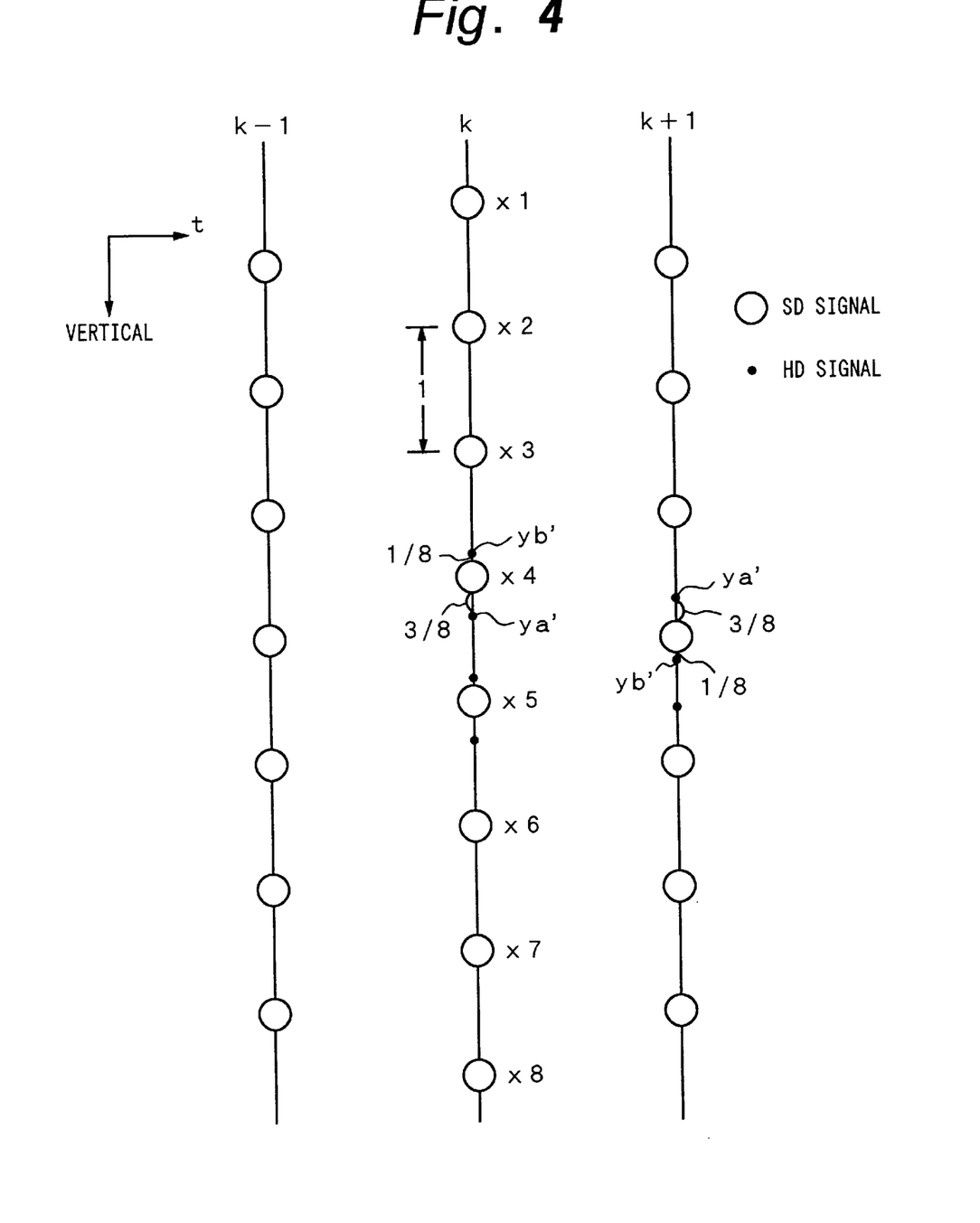
FIG. 4 is a schematic diagram for explaining an up-conversion process.

The up-conversion process will now be described in more detail with respect to, for example, the process in the vertical direction. FIG. 4 shows the relation of pixel arrays among three fields (shown by k−1, k, k+1) which continue with respect to the time. From the relation of an interlace scan, there is a positional deviation of 0.5 H between a line position in the field k and a line position in the previous field k−1 (or a line position in the field k+1 subsequent to the field k). In case of such an interlace scan, the interlace relation is broken when the number of lines in each field is merely doubled.

When an interval between the lines in the vertical direction is shown by "1", for example, an HD pixel (shown by a painted circle) yb' is formed at a position of a distance ⅛ above an SD pixel (shown by a blank circle) x4 and an HD pixel (shown by a painted circle) ya' is formed at a position of a distance ⅜ below the SD pixel x4, thereby enabling the number of lines to be doubled while holding the interlace relation. In the next field k+1, the HD pixel ya' is formed at a position of a distance ⅜ above the SD pixel and the HD pixel yb' is formed at a position of a distance ⅛ below the SD pixel. Since the position where the HD pixel is formed is switched depending on the field as mentioned above, it is necessary to also switch the coefficients depending on the field. The coefficient memory 115a has a memory for separately storing two sets of coefficients for forming the HD pixels ya' and yb', respectively, and a switching circuit for switching the two sets of coefficients every field.

The order of the SD pixels, for example, in the (k)th field is converted to the order of $x_1, x_2, x_3, \ldots$ by the horizontal/vertical scanning line converting circuit 121a in FIG. 3. Target pixel values $y_a'$ and $y_b'$ are formed by seven successive SD pixels in the time series and two sets of coefficients $a_1$ to $a_7$ and $b_1$ to $b_7$ read out from the coefficient memory 115a, respectively. That is:

$$y_a' = a_1 x_1 + a_2 x_2 + \ldots + a_7 x_7$$
$$y_b' = b_1 x_2 + b_2 x_3 + \ldots + b_7 x_8$$

The SD pixel value necessary for forming the HD pixel value $y_a'$ and the SD pixel value necessary for forming the HD pixel value $y_b'$ are outputted from the delay and selecting circuit 112a and are switched by the switching circuit 114a and the switched pixel is supplied to the filter operating circuit 116a. The HD pixel values $y_a'$ and $y_b'$ are calculated by the above-mentioned linear coupling in the filter operating circuit 116a, thereby deriving a vertical double speed signal in which the number of pixels in the vertical direction is doubled at the output terminal t3.

On the other hand, in a manner similar to the above, an arithmetic operation of a 1-dimensional filter is executed by, for example, the values of seven SD pixels in the horizontal direction and the coefficients from the coefficient memory 115a, thereby forming a horizontal double speed signal in which the number of pixels is doubled in the horizontal direction. For example, in case of the input SD signal of 13.5 MHz, the vertical double speed signal having a sampling rate of 27 MHz is generated and the HD signal having a sampling rate of 54 MHz is generated at the output terminal t4 by a horizontal process.

In case of an example of a noise reducer, which will be described hereinlater, the delay and selecting circuits 112a and 112b generate outputs of 2-dimensional taps so that the filter operating circuits 116a and 116b execute 2-dimensional filter operations. A 1-dimensional tap structure and a 2-dimensional tap structure can be switched by, for example, a construction of FIG. 5.

Figure 6A:
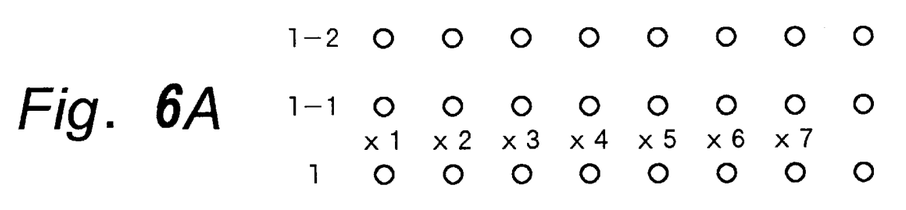
FIGS. 6A and 6B are schematic diagrams which is used for explaining an example of the delay and selecting circuit.
Figure 6B:
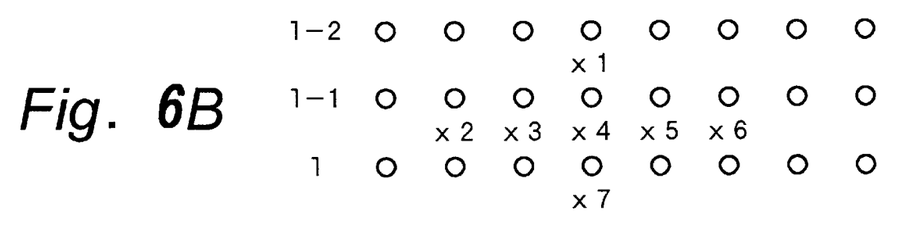

According to the example, the tap structures are switched depending on a case of the 1-dimensional tap structure (up-conversion) shown in FIG. 6A and a case of the 2-dimensional tap structure (noise reducer) shown in FIG. 6B. In the 1-dimensional tap structure of FIG. 6A, prediction pixel values are calculated by the linear coupling between the values $x_1$ to $x_7$ of seven pixels on the same line, for instance, on l-1 and the coefficients. In the 2-dimensional tap structure of FIG. 6B, the prediction pixel values are calculated by the linear coupling between the values of total seven pixels of the values $x_2$ to $x_6$ of five pixels on the line l-1 and the values $x_1$ and $x_7$ of the upper and lower pixels of $x_4$.

Figure 5:
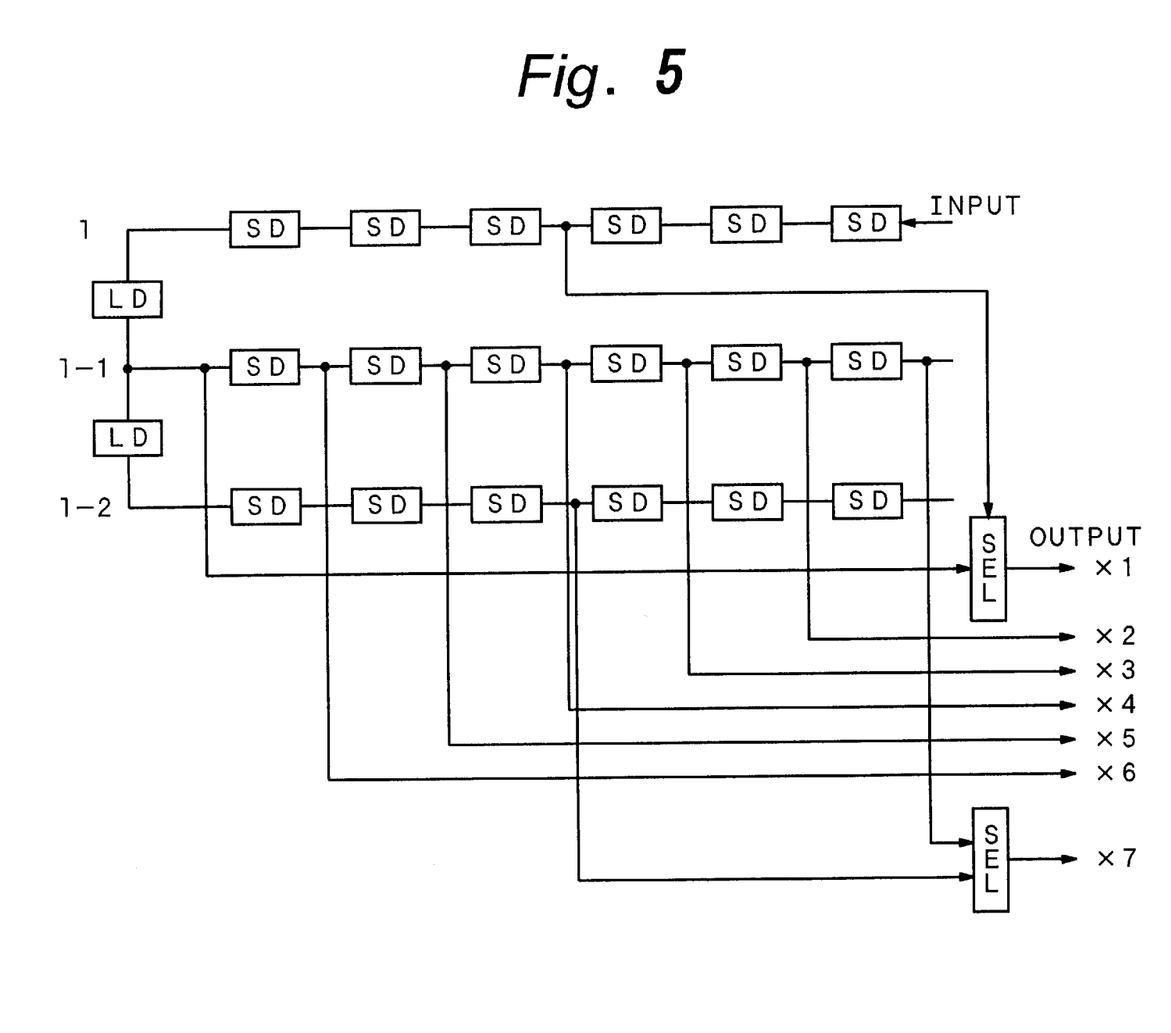
FIG. 5 is a block diagram of an example of a delay and selecting circuit.

In the construction of FIG. 5, SD denotes a sample delay element and LD indicates a line delay element. Since the two line delay elements are connected in serial, the signals of three lines l, l-1, and l-2 are simultaneously extracted from the inputs and outputs of the two line delay elements. Six sample delay elements connected in serial are connected to the signals of the lines, respectively. Consequently, pixels in a two-dimensional region of (three lines×seven pixels) as shown in FIG. 6 are simultaneously obtained from the input and output of each of the sample delay elements.

Between the 1-dimensional tap structure and the 2-dimensional tap structure, the values of the five pixels of $x_2$ to $x_6$ are commonly used. It is constructed that with respect to $x_1$ and $x_7$, a necessary value is selected in correspondence to each tap structure by two selectors. As mentioned above, the delay and selecting circuit 112a can switch the 1-dimensional tap structure and the 2-dimensional tap structure in accordance with the selector control signal while commonly using many delay elements. Although the delay and selecting circuit 112b also has a construction similar to that shown in FIG. 5, a 3-dimensional tap structure can be also used by also inputting an output which is delayed by one frame from the input terminal t2'.

The coefficients stored in the coefficient memories 115a and 115b have preliminarily been obtained by a learning and written by an initializing operation. The coefficient is decided every class of the target pixel. For example, $y_a'$ and $y_b'$ indicate the data of the target pixel in FIG. 4. One of the class sorting methods uses patterns of the level distribution of input signals around the target pixel. For example, in FIG. 4, the class is sorted on the basis of the patterns of the level distribution of three pixel data (SD signals) around the target pixel.

Since the pixel data is generally quantization data of eight bits, in case of three pixels, the data has (8×3=24 bits). The number of all of the combinations of 24 bits is equal to $2^{24}$. The number of classes is enormous, so that a hardware such as a memory or the like for storing the coefficients is complicated. By compressing the number of bits of each pixel which are used for the class sorting, the class sorting circuits 111a and 111b set the number of classes to proper values.

One of methods of compressing the number of bits of each pixel which is referred to for the class sorting is to normalize the pixels in the level direction. As an example, an average value of the three pixels which are referred to is obtained and the peripheral pixels are compressed from eight bits to one bit in accordance with the magnitude for the average value. That is, in case of a value larger than the average value, '1' is allocated and in case of a value smaller than the average value, '0' is allocated. Thus, class information is indicated by a code signal of three bits.

Figure 7:
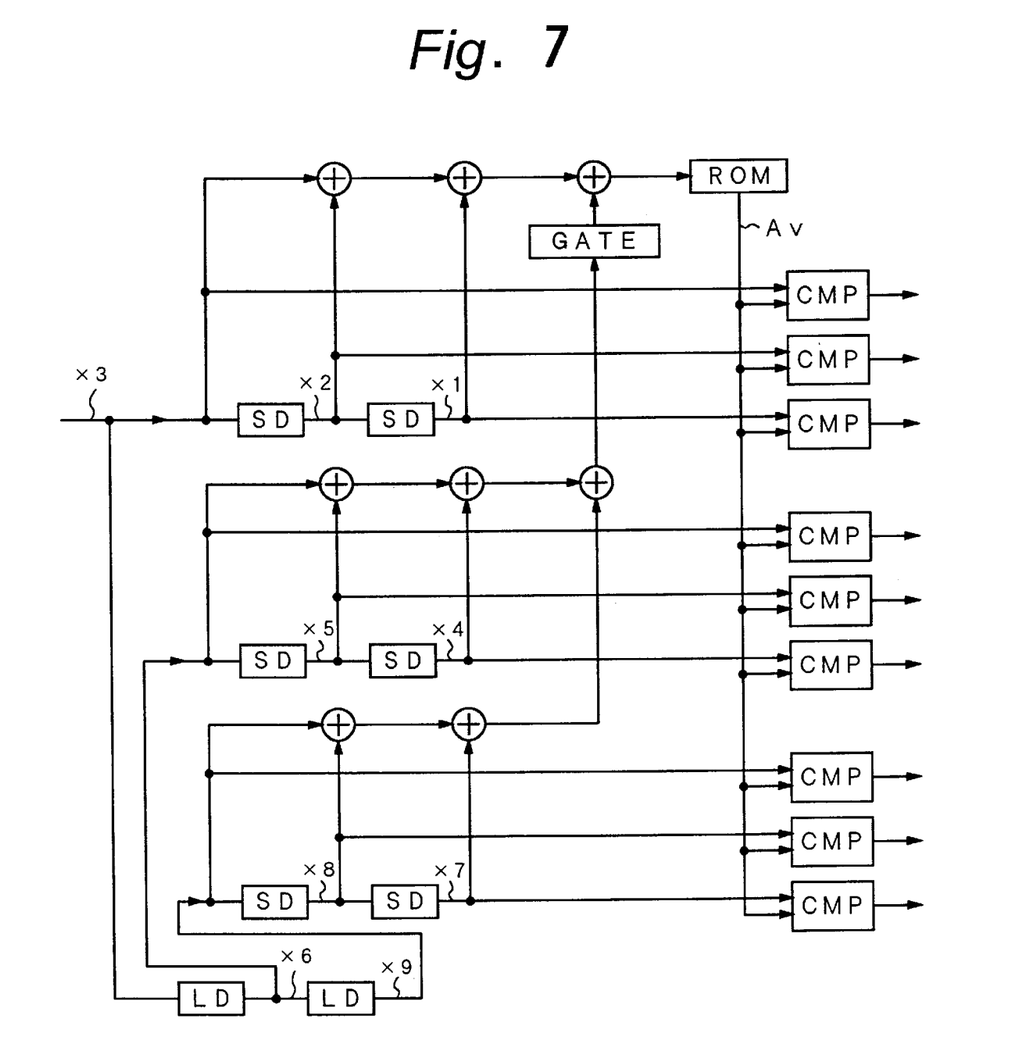
FIG. 7 is a block diagram of an example of a class sorting circuit.

FIG. 7 shows an example of the class sorting circuit 111a. As shown in FIG. 8B, nine pixels included in a 2-dimensional area of (3 lines×3 pixels) are simultaneously outputted by two line delay elements (LD) and total six sample delay elements (SD) provided every two elements with respect to each line data. As a method of the class sorting, there are 1-dimensional class sorting, 2-dimensional class sorting, and 3-dimensional class sorting. In a noise reducer, which will be described hereinlater, processes of the 2-dimensional class sorting and 3-dimensional class sorting are necessary.

Figure 8A:
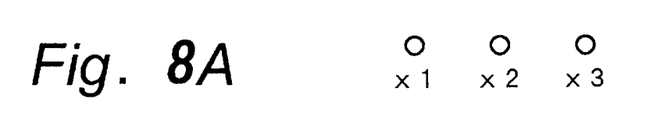
FIGS. 8A and 8B are schematic diagrams which is used for explaining an example of the class sorting circuit.
Figure 8B:
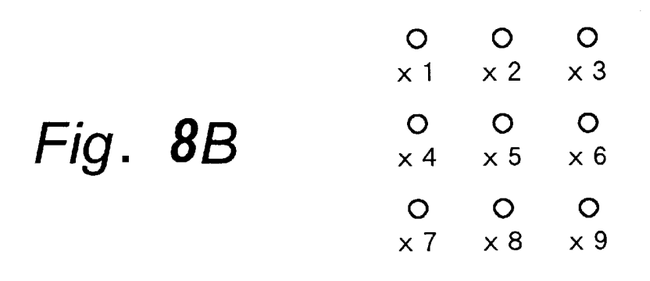

In the 1-dimensional class sorting, as shown in FIG. 8A, three successive pixels ($x_1$, $x_2$, and $x_3$) on a time series (the same line) are used. In the 2-dimensional class sorting, nine pixels in the 2-dimensional area of (3 lines×3 pixels) are used as shown in FIG. 8B. By using an image signal of one frame before, the 3-dimensional class sorting can be executed. In the example of FIG. 7, the 1-dimensional class sorting and the 2-dimensional class sorting can be switched.

In case of the 1-dimensional class sorting using three pixels, a gate circuit is turned off, the sum $(=x_1+x_2+x_3)$ of the values of the three pixels is supplied to an ROM, and the ROM generates an average value Av of the three pixel values. In case of the 2-dimensional class sorting using nixe pixels, the gate circuit is turned on, the sum $(=x_1+x_2+x_3+ \ldots +x_9)$ of the values of the nine pixels is supplied to the ROM, the ROM generates an average value of the values of the nine pixels as an average value Av.

The average value from the ROM and the value of each pixel are compared by a comparison circuit and a comparison output which is equal to '1' when the pixel value is larger than the average value and is equal to '0' when the pixel value is equal to or less than the average value, that is, the class information is generated. In the construction of FIG. 7, by controlling the gate circuit and the ROM, either one of the 1-dimensional class sorting and the 2-dimensional class sorting can be executed.

As another method of normalization, an ADRC can be also used. The ADRC is a process such that a dynamic range DR and a minimum value MIN of a plurality of pixels are detected, the minimum value MIN is subtracted from the value of each pixel, the value obtained by subtracting the minimum value is divided by the dynamic range DR, and the quotient is rounded to an integer.

A case of a 1-bit ADRC will be described as an example. A maximum value MAX and the minimum value MIN among the three pixels are detected and the dynamic range DR (=MAX−MIN) is calculated. The minimum value MIN is subtracted from the value of each pixel and the value from which the MIN was subtracted is divided by the dynamic range DR. The quotient of the division is compared with 0.5. When the quotient is equal to or larger than 0.5, '1' is set. When the quotient is less than 0.5, '0' is set. According to the 1-bit ADRC, a result that is substantially the same as that of the above case of comparing the average value and the value of each pixel is obtained. In case of a 2-bit ADRC, the value from which the minimum value was subtracted is divided by a quantization step width calculated by $DR/2^2$.

Figure 9:
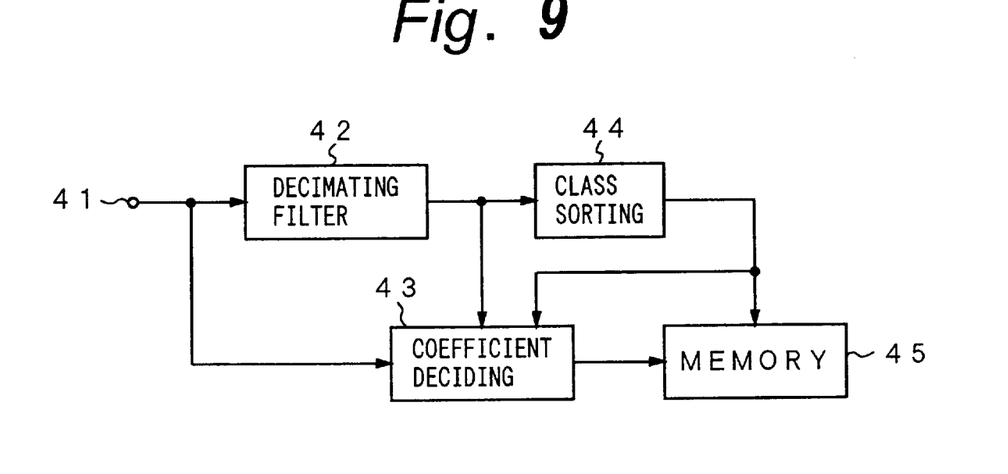
FIG. 9 is a block diagram of an example of a construction for obtaining coefficients for the up-conversion process.

A learning for obtaining the coefficients to be stored in the coefficient memories 115a and 115b, will now be described. FIG. 9 shows a construction at the time of a learning for deciding the coefficients which are stored in the coefficient memory 115a. Since the coefficients to be stored in the coefficient memory 115b, are also decided in a manner similar to the above, its description is omitted here. In FIG. 9, the HD signal which was vertical/horizontal scanning converted is supplied to an input terminal shown by reference numeral 41 and the number of pixels is decimated to the half by a decimating filter 42. An output signal of the decimating filter 42 is supplied to a coefficient deciding circuit 43 and a class sorting circuit 44. The class sorting circuit 44 decides a class of the target pixel by using peripheral pixels in a manner similar to the class sorting circuit 111a. A class code from the class sorting circuit 44 is supplied to the coefficient deciding circuit 43 and a memory 45, respectively.

The coefficient deciding circuit 43 decides coefficients such as to minimize a square sum of an error between the prediction value which is formed by the linear coupling and its true value. The HD signal which is supplied to the input terminal 41 is supplied as a true value of the target pixel to the coefficient deciding circuit 43. The coefficient deciding circuit 43 decides the best prediction coefficient by a method of least squares. The decided coefficient is stored into the memory 45. A storing address is indicted by a class code from the class sorting circuit 44.

An operation for deciding the coefficient by a software process will now be described with reference to FIG. 10. A control of a process is first started from step 51. In a formation of learning data in step 52, leaning data corresponding to a known image is formed. In a data finishing process in step 53, if a process of all of the inputted data, for example, the data of one frame has been finished, the processing routine advances to a prediction coefficient decision in step 56. If the process is not finished, the control is shifted to a class decision in step 54.

The class decision in step 54 is a step of executing the class deciding process with respect to the above-mentioned target pixel and forming the class code for indicating the class. In a formation of a normal equation in next step 55, a normal equation, which will be described hereinlater, is formed. After completion of the processes of all of the data, the control is shifted from the data finishing process in step 53 to step 56. In the prediction coefficient decision in step 56, an equation (8), which will be expressed hereinlater, is solved by using a matrix solution, thereby deciding the coefficient. In a prediction coefficient storing process in step 57, the prediction coefficient is stored into the memory 45 and the control of the learning process is finished in step 58.

The processes in step 55 (normal equation formation) and step 56 (prediction coefficient decision) in FIG. 10 will be described in more detail. At the time of the learning, a true value (y) of the target pixel is known. When a correction value of the target pixel is set to y' and values of the pixels around the target pixel are set to $x_1$ to $x_n$, the linear coupling of (n) taps by coefficients $w_1$ to $w_n$ (corresponding to the above-mentioned $a_1$ to $a_n$ or $b_1$ to $b_n$) is set every class as follows:

$$y' = w_1 x_1 + w_2 x_2 + \ldots + w_n x_n \tag{1}$$

$w_i$ is an undetermined coefficient before the learning.

The learning is performed every class as mentioned above and when the number of data is equal to (m), the following equation is obtained in accordance with the equation (1).

$$Y_j' = w_1 x_{j1} + w_2 x_{j2} + \ldots + w_n x_{jn} \tag{2}$$

(where, j=1, 2, . . . m)
When m>n, since $w_i$ to $w_n$ are not decided unconditionally, elements of an error vector E are defined as:

$$e_j = y_j - (w_1 x_{j1} + w_2 x_{j2} + \ldots w_n x_{jn}) \tag{3}$$

(where, j=1, 2, . . . m)
thereby obtaining a coefficient which minimizes the following equation (4).

$$E^2 = \sum_{j=0}^{m} \{e_j\}^2 \tag{4}$$

This is a solution by what is called a method of least squares. Now, a partial differential coefficient by $w_i$ in the equation (4) is obtained.

$$\frac{\partial E^2}{\partial W_i} = \sum_{j=0}^{m} 2\left(\frac{\partial e_j}{\partial W_i}\right) e_j = \sum_{j=0}^{m} 2 x_{ji} \cdot e_j \tag{5}$$

Since it is sufficient to decide $w_i$ so that the equation (5) is equal to zero, by setting $$X_{ji} = \sum_{p=0}^{m} x_{pi} \cdot x_{pj} \tag{6}$$

$$Y_i = \sum_{J=0}^{m} x_{ji} \cdot y_j \tag{7}$$

a matrix is used as follows:

$$\begin{bmatrix} X_{11} & X_{12} & \cdots & X_{1n} \\ X_{21} & X_{22} & \cdots & X_{2n} \\ \cdots & \cdots & \cdots & \cdots \\ X_{m1} & X_{m2} & \cdots & X_{mn} \end{bmatrix} \begin{bmatrix} W_1 \\ W_2 \\ \cdots \\ W_n \end{bmatrix} = \begin{bmatrix} Y_1 \\ Y_2 \\ \cdots \\ Y_2 \end{bmatrix} \tag{8}$$

The equation is generally called a normal equation. When the equation is solved with respect to $w_i$ by using a general matrix solution such as a sweep-out method or the like, the prediction coefficients $w_i$ are obtained. The prediction coefficients $w_i$ are stored into the memory 45 by using the class code as an address.

The up-conversion based on the class sorting adapting process is not limited to the above example but various constructions can be also used. For example, it is also possible that the prediction value itself has preliminarily been obtained by the learning and can be stored in the memory. The value of the HD pixel can be also obtained by the 2-dimensional or 3-dimensional process instead of the 1-dimensional process.

Another example of the signal process circuit constructed by the LSI 10 shown in FIG. 2 will now be described. Another example relates to a digital noise reducer constructed as shown in FIG. 11 by the setting of the control signal.

In FIG. 11, a digital video signal including noises is supplied to an input terminal shown by reference numeral 122. The input video signal is supplied to the input terminals t1 and t2 of the LSI 10 and a frame memory 123. A video signal of the preceding frame from the frame memory 123 is supplied to the input terminal t2' of the LSI 10.

The video signal of the present frame from the input terminal t1 is supplied to the class sorting circuit 111a delay and selecting circuit 112a, and line delay circuit 117, respectively. The video signal of the present frame supplied to the input terminal t2 is supplied to the class sorting circuit 111b and delay and selecting circuit 112b, respectively. The line delay circuit 117 is provided for simultaneously outputting data of a plurality of adjacent lines which is adjacent to the data in the order of the raster scanning. An output signal of the line delay circuit 117 is supplied to the class sorting circuits 111a and 111b and delay and selecting circuits 112a and 112b, respectively. The video signal of the preceding frame supplied to the input terminal t2' is supplied to the class sorting circuit 111b and delay and selecting circuit 112b, respectively.

The class information (code signal) obtained by the class sorting circuit 111a is supplied as an address to the coefficient memory 115a through the switching circuit 113a and the class information obtained by the class sorting circuit 111b is supplied as an address to the coefficient memory 115b through the switching circuit 113b. The coefficients preliminarily obtained by the learning have been stored in the coefficient memories 115a and 115b and the coefficient read out in correspondence to the class information is supplied to the filter operating circuit 116a functioning as a 2-dimensional filter and the filter operating circuit 116b functioning as a 3-dimensional filter, respectively.

The filter operating circuit (2-dimensional filter) 116a forms the noise-eliminated pixel data on a unit basis of a 2-dimensional block consisting of a plurality of adjacent pixels in the present frame. The filter operating circuit (3-dimensional filter) 116b forms the noise-eliminated pixel data on the unit basis of a 3-dimensional block consisting of a plurality of pixels in the present and preceding frames.

The video signals from which noises are eliminated are supplied from the filter operating circuits 116a and 116b to the product sum operating circuit 118. A composite video signal from the product sum operating circuit 118, namely, the digital video signal from which noises are eliminated is extracted to the output terminal t4 through the switching circuit 119. The product sum operating circuit 118 weights and adds the output signal of the filter operating circuit (2-dimensional filer) 116a and the output signal of the filter operating circuit (3-dimensional filter) 116b by a motion coefficient (K). The motion coefficient (K) is formed by the class sorting circuit 111b.

The class sorting circuit 111a executes the 2-dimensional class sorting. That is, the class of the target pixel is decided on the basis of the pattern of the level distribution of the blocks around the target pixel. On the other hand, the class sorting circuit 111b executes a 3-dimensional class sorting. Although the 3-dimensional class sorting can be executed on the basis of the pattern of the level distribution of the 3-dimensional blocks, in order to generate the motion coefficient (K), the class sorting based on the result of the motion detection is preferable.

As one of the known motion detecting methods, what is called a gradient method can be used. This is a method of obtaining a motion amount by using a frame difference and gradient information (a sampling difference in the horizontal direction and a line difference in the vertical direction) with respect to all of the pixels in the motion area. When a gradient portion of the video signal is moved, a frame difference $\Delta F$ (obtained by subtracting a corresponding pixel value of the preceding frame from the pixel value of the present frame) and a sampling difference $\Delta E$ (obtained by subtracting the value of the previous pixel from the value of the present pixel) E are obtained. A magnitude of a motion amount v1 in the horizontal direction is obtained from an integration value $\Sigma|\Delta F|$ in a motion area of an absolute value $|\Delta F|$ of the frame difference $\Delta F$ and an integration value $\Sigma|\Delta E|$ in a motion area of an absolute value $|\Delta E|$ of the sampling difference $\Delta E$. That is, $|v1|=\Sigma|\Delta F|/\Sigma|\Delta E|$ The direction of the motion can be obtained from the relation between the polarity of the frame difference $\Delta F$ and the polarity of the sampling difference $\Delta E$. The motion in the vertical direction can be also detected in a manner similar to the above.

The class sorting circuit 111b obtains the motion amount by, for example, the above-mentioned gradient method and generates the motion coefficient (K) in accordance with the motion amount. The class sorting is executed on the basis of the frame difference $\Delta F$ (or $|\Delta F|$) and the sampling difference $\Delta E$ (or $|\Delta E|$). In this case, the class sorting is executed so as to form the proper number of classes by using the values obtained by normalizing values of the frame difference and the sampling difference.

Figure 12:
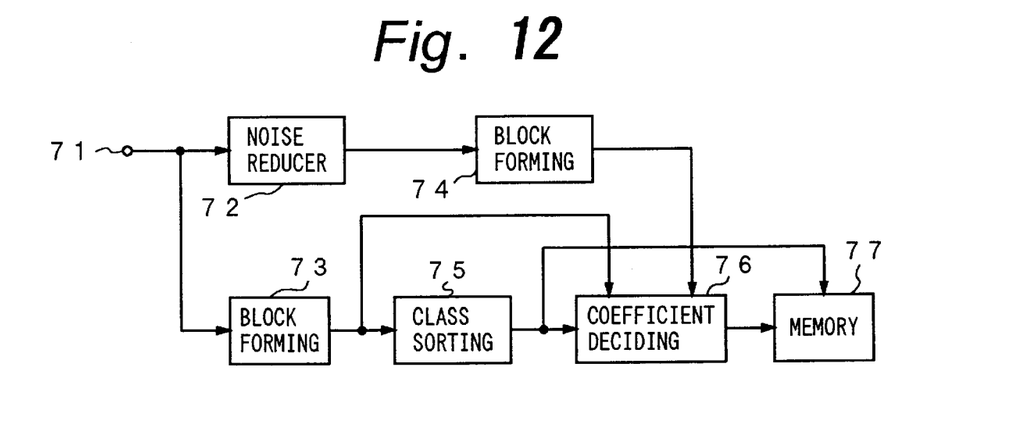
FIG. 12 is a block diagram of an example of a construction for obtaining coefficients for a noise eliminating process.

The 2-dimensional process will be described as an example with respect to the above noise reducer. The coefficients obtained by the learning have preliminarily been stored in the coefficient memory 115a. FIG. 12 shows a construction at the time of the learning and the digital video signal including noises is supplied to an input terminal shown by reference numeral 71. The input signal is supplied to a noise reducer 72 and a block forming circuit 73. The noise reducer 72 eliminates noises in the input signal. As an example, a noise reducer using a memory of (N) frames for forming an average value of images of (N+1) frames can be used. That is, since noises are generally random, the noises are eliminated by the averaging.

An output signal (noise reduction signal) of the noise reducer 72 is supplied to a block forming circuit 74. The block forming circuits 73 and 74 are time series converting circuits for converting the order of the raster scanning into data in the order of blocks. An output signal of the block forming circuit 73 is supplied to a class sorting circuit 75. The class sorting circuit 75 decides the class of the target pixel on the basis of the level distribution in the blocks while setting the target to the center. The class information from the class sorting circuit 75 is supplied to a coefficient deciding circuit 76 and a memory 77.

An input signal and a noise reduction signal are supplied from the block forming circuits 73 and 74 to the coefficient deciding circuit 76. The coefficient deciding circuit 76 decides the best coefficient by the method of least squares in a manner similar to the above-mentioned coefficient decision in case of the up-conversion. That is, when the prediction value of the target pixel is generated by the linear coupling between the plurality of pixels (pixels of the input signal) in the blocks around the target pixel and the plurality of coefficients, the coefficient to minimize the error between the prediction value and the value of the corresponding pixel in the noise reduction signal is decided. The decided coefficient from the coefficient deciding circuit 76 is written into an address of the memory 77 which is designated by the class information.

Figure 13A:
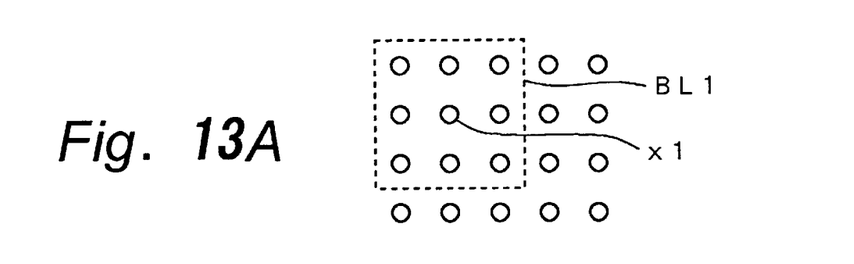
FIGS. 13A to 13D are schematic diagrams for explaining the noise eliminating process.
Figure 13B:
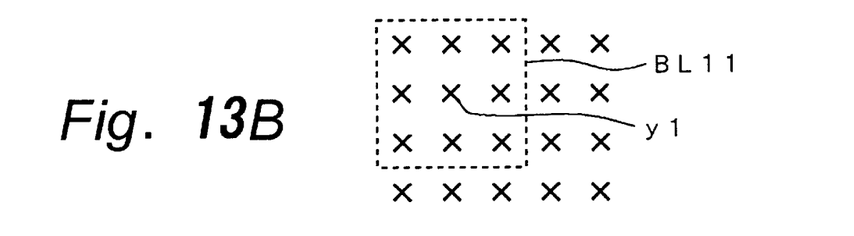
Figure 13C:
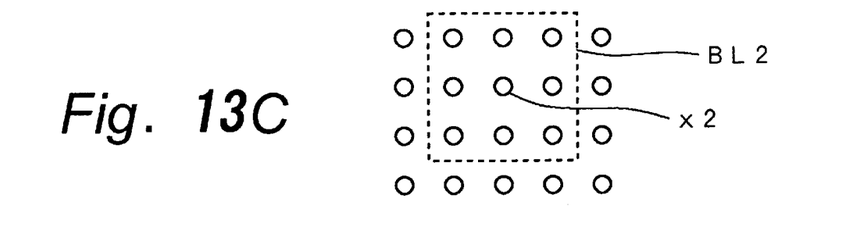
Figure 13D:
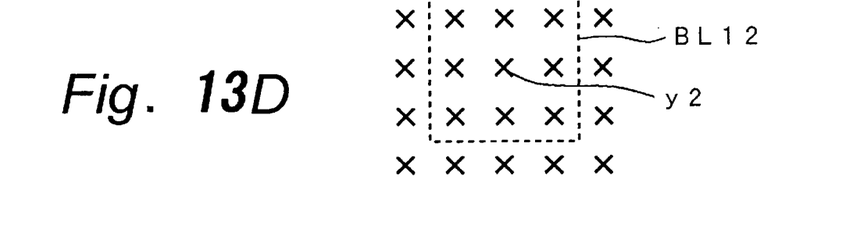

The block forming circuit 73 forms, for example, a block EL1 of a size of (3×3) by setting the pixel $x_1$ to the center as shown in FIG. 13A. On the other hand, the block forming circuit 74 forms a block BL11 of a size of (3×3) by setting the pixel $y_1$ as a center as shown in FIG. 13B. The pixels $x_1$ and $y_1$ are pixels at corresponding positions in images. The pixel $x_1$ includes noises and the noises are reduced in the pixel $y_1$. Next blocks BL2 and BL12 are blocks which are obtained by shifting the boundary of the blocks BL1 and BL11 by one pixel as shown in FIGS. 13C and 13D and each of pixels $x_2$ and $y_2$ is set to the center.

Figure 10:
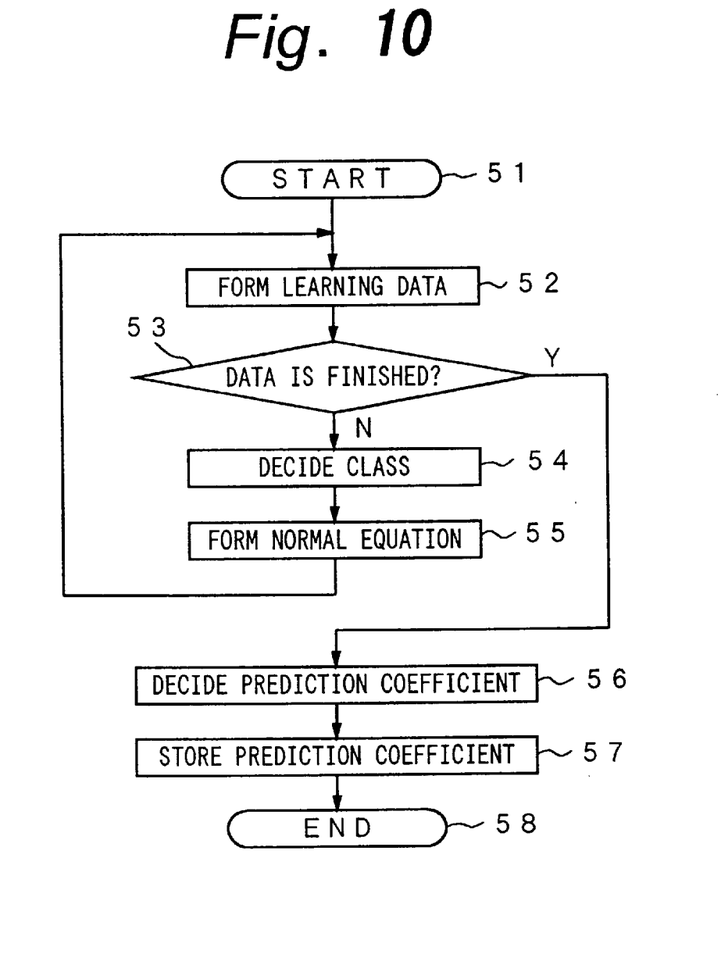
FIG. 10 is a flowchart when a learning for obtaining prediction coefficients is executed by a software process.

As mentioned above, by shifting the boundary of the block, a number of data for learning is collected and the coefficient is decided by the flowchart of FIG. 10 and the above-mentioned processes. Thus, when the block BL1 of the input signal shown in FIG. 13A is given, the prediction value formed by the linear coupling between the values of eight pixels (values of the pixels except the target pixel $x_1$) in the block BL1 and eight coefficients is substantially the same as the value $y_1$ of the pixel including no noise. Thus, the noises of the target pixel $x_1$ are eliminated.

In addition to the class sorting and filter operation, the filter operating circuit (3-dimensional filter) 116b executes the noise eliminating process in a manner similar to the above-mentioned filter operating circuit (2-dimensional filter) 116a. Since the motion coefficient (K) corresponds to the motion amount, an output signal of the filter operating circuit 116a is multiplied by the coefficient (K), an output signal of the filter operating circuit 116a is multiplied by a coefficient (1-K), and the signals multiplied by those coefficients are added. That is, since a correlation of images in the time direction is small when the motion amount is large, a weight of the output of the filter operating circuit 116a is set to be large.

Although the specific examples of the up-conversion and the noise reducer have been described, they can be controlled by the control signal so as to make functions of the digital signal process other than them effective. In the example of the digital image signal process using the class sorting adapting process, an interpolating circuit for interpolating the pixels which were decimated by a sub-sampling, a forming circuit of a key signal in a digital chroma key apparatus, and the like can be constructed.

The invention as mentioned above is not limited to a specific function like an exclusive-use LSI and a range of the functions to be realized is limited to a certain extent like the class sorting adapting process in the foregoing embodiment. Therefore, the efficient process can be executed although there is not a sufficient generality like a DSP.

We claims:

1. An integrated circuit for processing a digital signal, in which a plurality of circuit groups and a number of selecting devices which can switch at least two states are provided in a single integrated circuit and said number of selecting devices are selectively controlled by a control signal which is indicative of a desired signal processing function to be performed by the integrated circuit and which is supplied from outside the integrated circuit, wherein when said number of selecting devices provided in said single integrated circuit select a first selection state, at least a part of said plurality of circuit groups is set to a first connecting state and is enabled to perform a first signal processing function in said first connection state and, when said number of selecting devices provided in said single integrated circuit select a second selection state, at least a part of said plurality of circuit groups is set to a second connection state different from said first connection state and is enabled to perform a second signal processing function different from said first signal processing function in said connection state.

2. An integrated circuit for processing a digital signal according to claim 1, in which the first signal processing function involves changing a resolution of said digital signal and the second signal processing function involves noise reduction.

3. An integrated circuit for processing a digital signal, in which a plurality of circuit groups and a number of selecting devices which can switch at least two states are provided in a single integrated circuit and said number of selecting devices are selectively controlled by a control signal which is indicative of a desired signal processing function to be performed by the integrated circuit and which is supplied from outside the integrated circuit, wherein when said number of selecting devices provided in said single integrated circuit select a first selection state, at least a part of said plurality of circuit groups is set to a first connection state and is enabled to perform a first signal processing function in said first connection state and when said number of selecting devices provided in said single integrated circuit select a second selection state, at least a part of said plurality of circuit groups is set to a second connection state different from said first connection state and is enabled to perform a second signal processing function different from said first signal processing function in said connection state, and wherein at least a part of said plurality of circuit groups is set to have a circuit function which is different in accordance with the selection state of said number of selecting devices, thereby switching the signal processing functions of the whole integrated circuit.

4. An integrated circuit for processing a digital signal according to claim 2, characterized in that said plurality of circuit groups comprise: first and second filter operating means; means for supplying tap outputs to said first and second filter operating means; means for sorting a class of pixel data which is predicted by said first and second filter operating means, respectively; and a memory for giving filter coefficients to said first and second filter operating means in correspondence to class information from said class sorting means, respectively.

5. An integrated circuit for processing a digital signal according to claim 4, in which one of the selection states is one of a one-dimensional digital filter, a 2-dimensional digital filter, and a 3-dimensional digital filter.

6. An integrated circuit for processing a digital signal according to claim 4, characterized in that as a tap output which is given to one of said first and second filter operating means, it is enabled to switch at least a one-dimensional tap output and a two-dimensional tap output.

7. An integrated circuit for processing a digital signal according to claim 4, characterized in that as a class sorting for generating a coefficient which is given to one of said first and second filter operating means, it is enabled to switch at least a one-dimensional class sorting and a two-dimensional class sorting.

8. An integrated circuit for processing a digital signal according to claim 2, in which the first signal processing function involves chancing a resolution of said digital signal and the second signal processing function involves noise reduction.

9. An integrated circuit for processing a digital signal having a plurality of circuit groups and a number of selecting devices for selecting at least two states which are provided in a single integrated circuit formed on a single chip, said number of selecting devices being selectively controlled by a control signal which is indicative of a desired signal processing function to be performed by the integrated circuit and which is supplied from outside said chip such that when said number of selecting devices provided in said single integrated circuit formed on said single chip select a first selection state, at least a part of said plurality of circuit groups is set to a first connection state and is enabled to perform a first signal processing function in said first connection state and, when said number of selecting devices provided in said single integrated circuit formed on said single chip select a second selection state, at least a part of said plurality of circuit groups is set to a second connection state different from said first connection state and is enabled to perform a second signal processing function different from said first signal processing function in said first connection state.

10. An integrated circuit for processing a digital signal having a plurality of circuit groups and a number of selecting devices for selecting at least two states which are provided in a single integrated circuit formed on a single chip, said number of selecting devices being selectively controlled by a control signal which is indicative of a desired signal processing function to be performed by the integrated circuit and which is supplied from outside said chip such that when said number of selecting devices provided in said single integrated circuit formed on said single chip select a first selection state, at least a part of said plurality of circuit groups is set to a first connection state and is enabled to perform a first signal processing function in said first connection state and when said number of selecting devices provided in said single integrated circuit formed on said single chip select a second selection state, at least a part of said plurality of circuit groups is set to a second connection state different from said first connection state and is enabled to perform a second signal processing function different from said first signal processing function in said first connection state, and in which at least a part of said plurality of circuit groups has a circuit function which is set in accordance with the selection state of said number of selecting devices so as to set the signal processing functions of the entire integrated circuit.

* * * * *